United States Patent
Sugio et al.

(10) Patent No.: US 10,369,516 B2
(45) Date of Patent: Aug. 6, 2019

(54) COMPRESSED-AIR DRYING SYSTEM

(71) Applicant: NABTESCO AUTOMOTIVE CORPORATION, Tokyo (JP)

(72) Inventors: Takuya Sugio, Tokyo (JP); Hiroaki Kawanami, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 44 days.

(21) Appl. No.: 15/311,702

(22) PCT Filed: May 26, 2015

(86) PCT No.: PCT/JP2015/065031
§ 371 (c)(1),
(2) Date: Feb. 15, 2017

(87) PCT Pub. No.: WO2015/182582
PCT Pub. Date: Dec. 3, 2015

(65) Prior Publication Data
US 2017/0157558 A1  Jun. 8, 2017

(30) Foreign Application Priority Data
May 27, 2014  (JP) ................ 2014-109128

(51) Int. Cl.
*B01D 53/02* (2006.01)
*B01D 53/26* (2006.01)
(Continued)

(52) U.S. Cl.
CPC ....... *B01D 53/261* (2013.01); *B01D 46/0036* (2013.01); *B01D 46/0068* (2013.01);
(Continued)

(58) Field of Classification Search
CPC ............ B01D 46/0036; B01D 46/0068; B01D 53/261; B60G 2600/66; B60T 17/004
See application file for complete search history.

(56) References Cited

U.S. PATENT DOCUMENTS 4,655,801 A * 4/1987 Kojima ................ B01D 53/261
55/DIG. 17
5,669,154 A  9/1997 Bellomo
(Continued)

FOREIGN PATENT DOCUMENTS

AT  394167 B  2/1992
EP  0504596 A2  9/1992
(Continued)

OTHER PUBLICATIONS

Translation of AT394167, 1992, Jenbacher Werke AG.*
(Continued)

*Primary Examiner* — Christopher P Jones
(74) *Attorney, Agent, or Firm* — Pillsbury Winthrop Shaw Pittman, LLP

(57) ABSTRACT

A compressed-air drying system includes an air dryer, an oil mist separator and a reservoir. The air dryer includes desiccant and a drain port for draining liquid generated through regeneration of the desiccant. The oil mist separator includes a trapping portion for trapping oil contained, as oil mist, in the compressed air. The oil mist separator further includes a drain port for draining liquid containing the trapped oil. The oil mist separator is provided in a passage between the compressor and the air dryer. The reservoir stores the liquid drained from the air dryer and the liquid drained from the oil mist separator. The drain port of the air dryer and the drain port of the oil mist separator are connected to the reservoir.

14 Claims, 6 Drawing Sheets

(51) Int. Cl.
*B60T 17/00* (2006.01)
*F04B 39/04* (2006.01)
*F04B 39/16* (2006.01)
*B01D 46/00* (2006.01)
*F15B 21/048* (2019.01)

(52) U.S. Cl.
CPC .............. *B01D 53/26* (2013.01); *B60T 17/00* (2013.01); *F04B 39/04* (2013.01); *F04B 39/16* (2013.01); *B60G 2600/66* (2013.01); *B60T 17/004* (2013.01); *F15B 21/048* (2013.01)

(56) References Cited

U.S. PATENT DOCUMENTS

| | | | |
|---|---|---|---|
| 6,447,583 B1* | 9/2002 | Thelen .................. | B01D 53/06 95/113 |
| 7,857,882 B1* | 12/2010 | Johnson ................. | B01D 45/08 55/385.3 |
| 2005/0045041 A1* | 3/2005 | Hechinger ......... | B01D 53/0415 96/121 |
| 2012/0137887 A1* | 6/2012 | Minato .............. | B01D 53/0415 96/118 |

FOREIGN PATENT DOCUMENTS

| | | |
|---|---|---|
| GB | 2201356 A | 9/1988 |
| JP | S63-157234 U | 10/1988 |
| JP | H02-048125 U | 4/1990 |
| JP | H06-076798 U | 10/1994 |
| JP | 7-4880 U | 1/1995 |
| JP | H10-500053 A | 1/1998 |
| JP | 2013-234632 A | 11/2013 |
| JP | 2014-177221 A | 9/2014 |

OTHER PUBLICATIONS

International Preliminary Report on Patentability and the Written Opinion of the International Searching Authority as issued in International Patent Application No. PCT/JP2015/065031, dated Nov. 29, 2016.
Extended European Search Report EP Application No. 15799346.0 dated Mar. 16, 2018.

* cited by examiner

COMPRESSED-AIR DRYING SYSTEM

CROSS-REFERENCE TO RELATED APPLICATIONS

This application is the U.S. National Stage of PCT/JP2015/065031, filed May 26, 2015, which in turn claims priority to Japanese Patent Application No. JP 2014-109128, filed May 27, 2014. The contents of these applications are incorporated herein by reference in their entireties.

TECHNICAL FIELD

The present invention relates to a compressed-air drying system that is configured to remove oil mist and water contained in compressed air delivered from a compressor.

BACKGROUND ART

For example, vehicles such as trucks, buses, and construction machines use compressed air delivered from the compressor, which is directly connected to the internal combustion engine, in order to control systems such as brakes and suspensions. In the system mentioned above and other systems, compressed air delivered from a compressor includes oil mist, which is atomized lubricant, as well as water contained in the atmosphere. When compressed air containing water and oil mist enters such a system, it may become a cause of an operation defect of the systems. Thus, an air dryer is provided downstream of the compressor to remove water and oil mist from compressed air (for example, Patent Document 1).

When executing a loading mode operation (dehumidification), the above described air dryer removes oil and water from compressed air. When executing an unloading mode (regeneration), the air dryer removes adsorbed oil and water from the desiccant and drains resultant liquid containing the removed oil and water to the outside. The air dryer delivers the drained liquid to an oil separator to prevent the liquid from being discharged onto the road surface. The oil separator causes air containing oil and water to strike impingement members to separate gas and liquid from each other, thereby collecting oil and discharging cleaned air.

PRIOR ART DOCUMENT

Patent Document

Patent Document 1: Japanese Laid-Open Patent Publication No. 2013-234632

SUMMARY OF THE INVENTION

Problems that the Invention is to Solve

In recent years, a system has been developed that includes, in addition to an air dryer, an oil mist separator to reduce the content rate of oil in compressed dried air. The oil mist separator traps oil contained in compressed air as oil mist. The oil mist separator also operates to drain liquid containing trapped oil.

In a system having both a conventional oil mist separator and air dryer there is no device for collecting the liquid drained from the oil mist separator and it is therefore desired to be improved in this respect.

Accordingly, it is an objective of the present invention to provide a compressed-air drying system that is capable of collecting liquid drained from both an oil mist separator and an air dryer.

Means for Solving the Problems

Means and operational advantages for solving the above-described problem will now be described.

To achieve the foregoing objectives and in accordance with one aspect of the present invention, a compressed-air drying system is provided that is configured to remove oil and water contained in compressed air delivered from a compressor. The system includes an air dryer, an oil mist separator, and a reservoir. The air dryer includes desiccant and a drain port configured to drain liquid generated through regeneration of the desiccant. The oil mist separator includes a trapping portion and a drain port. The trapping portion is configured to trap oil contained, as oil mist, in the compressed air. The drain port is configured to drain liquid containing the trapped oil. The oil mist separator is provided in a passage between the compressor and the air dryer. The reservoir is configured to store the liquid drained from the air dryer and the liquid drained from the oil mist separator. The drain port of the air dryer and the drain port of the oil mist separator are connected to the reservoir.

With the above configuration, the drain port of the oil mist separator is connected to the reservoir. Thus, not only the liquid drained from the air dryer, but also the liquid drained from the oil mist separator is collected by the reservoir.

The compressed-air drying system preferably further includes a drain passage and a connecting portion. The drain passage is configured to drain, to the reservoir, the liquid drained from the air dryer and the liquid drained from the oil mist separator. The connecting portion connects, to the drain passage, the drain port of the air dryer and the drain port of the oil mist separator.

With the above configuration, the drain port of the oil mist separator is connected to the reservoir via the connecting portion and the drain passage. Thus, the liquid drained from the oil mist separator is collected by the reservoir. Also, since the oil mist separator and the air dryer share the drain passage, the space occupied by the compressed-air drying system is reduced.

The compressed-air drying system is preferably configured such that the drain port of the air dryer is connected to an upstream drain passage configured to drain the liquid drained from the air dryer to a downstream side, and that the connecting portion includes a first inlet connected to the drain port of the oil mist separator, a second inlet connected to the upstream drain passage, and an outlet connected to the drain passage.

With the above configuration, the first inlet of the connecting portion is directly connected to the discharge port of the oil mist separator. This reduces the number of components compared to, for example, a case in which the connecting portion connects an upstream drain passage connected to an oil mist separator to an upstream discharge port connected to an air dryer.

The compressed-air drying system is preferably configured such that the first inlet and the outlet of the connecting portion are connected to each other by a straight passage.

With the above configuration, the first inlet and the outlet of the connecting portion connected to the discharge port of the oil mist separator are connected by the straight passage. This reduces the pressure loss when the oil mist separator, which has a small purge volume, drains liquid, allowing the liquid to be drained preferentially.

The compressed-air drying system is preferably configured such that the oil mist separator is one of a plurality of oil mist separators arranged between the air dryer and the compressor, and that the drain port of the oil mist separator that is closest to the compressor is connected to the first inlet of the connecting portion.

With the above configuration, the oil mist separator closest to the compressor reduces the pressure loss when discharging liquid. This reduces the pressure loss of the other oil mist separators and the air dryer.

The compressed-air drying system is preferably configured such that the air dryer includes a pressure governor configured to output an air pressure signal to a supply passage and a drain valve device configured to be opened by the air pressure signal. The oil mist separator preferably includes a drain valve device configured to be opened by the air pressure signal output by the pressure governor. The drain valve device of the air dryer is preferably connected to the drain valve device of the oil mist separator via the supply passage. One of the drain valve device of the oil mist separator and the drain valve device of the air dryer is preferably configured to be opened prior to the other.

With the above configuration, the drain valve device of the air dryer and the drain valve device of the oil mist separator can be opened by an air pressure signal output by the pressure governor of the air dryer. In this case, since one of the drain valve devices discharges liquid prior to the other, the fluid in the passage for discharging liquid is drawn toward the downstream side. Thus, even if one of the drain valve devices is opened prior to the other, the liquid is easily drained from the latter one.

Effects of the Invention

The present invention is capable of collecting liquid drained from both an oil mist separator and an air dryer.

MODES FOR CARRYING OUT THE INVENTION

A compressed-air drying system according to one embodiment will now be described. In the present embodiment, the compressed-air drying system is mounted on a vehicle.

Figure 1:
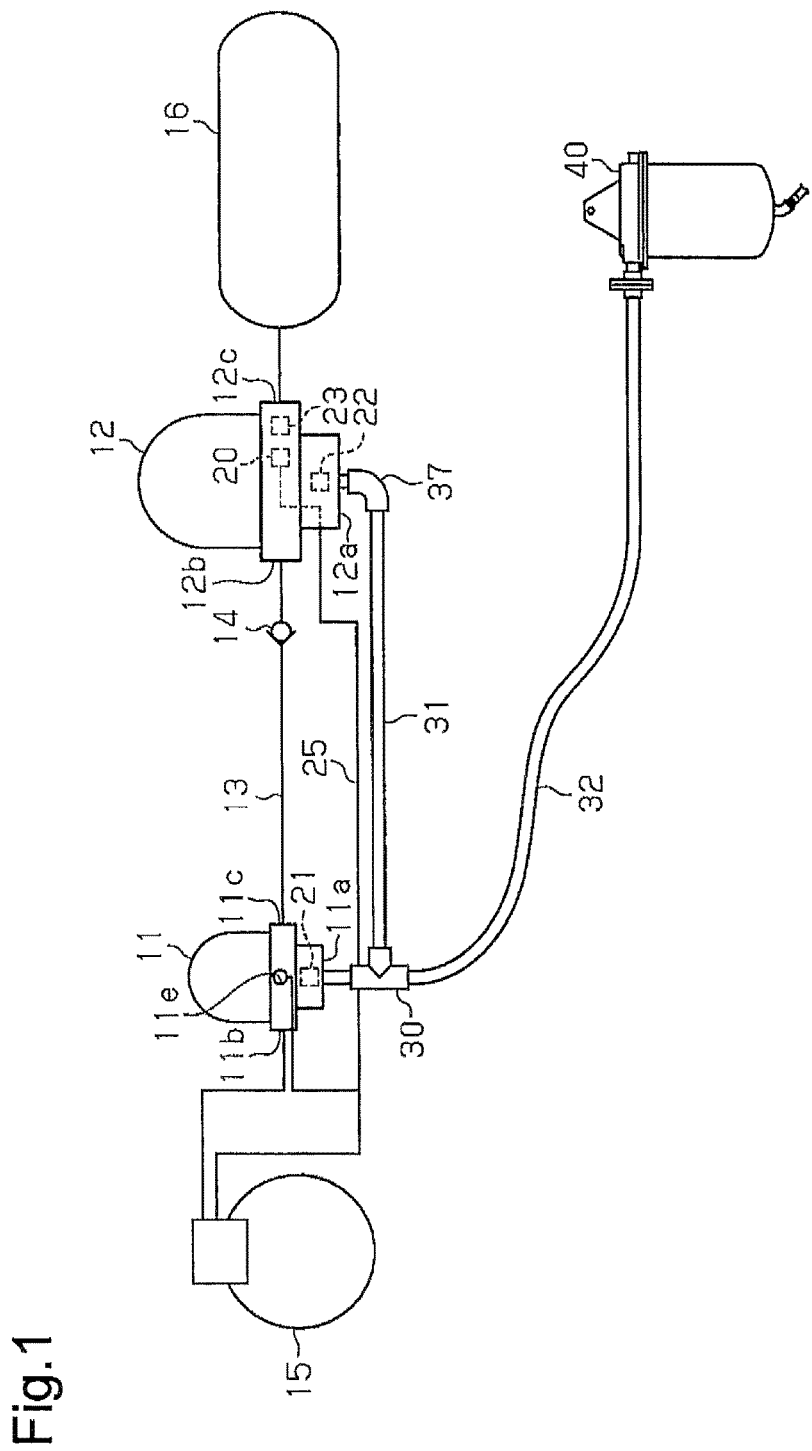
FIG. 1 is a diagram illustrating a compressed-air drying system.

As shown in FIG. 1, the compressed-air drying system includes an oil mist separator 11, an air dryer 12, and an oil separator 40, which corresponds to a reservoir. The oil mist separator 11 has an inlet 11b and an outlet 11c. The inlet 11b is connected to a compressed-air delivery port of a compressor 15. The outlet 11c is connected to an inlet 12b of the air dryer 12 via a passage 13. The oil mist separator 11 removes oil mist from compressed air and delivers the oil mist via the outlet 11c. The air dryer 12 has an outlet 12c connected to an air tank 16. The air dryer 12 discharges compressed dried air through the outlet 12c. The air tank 16 temporarily retains the compressed dried air and supplies it to loads such as air suspension systems and brake systems.

A check valve 14 is arranged between the oil mist separator 11 and the air dryer 12. The check valve 14 restricts flow the direction of which is opposite to that of the flow of compressed dried air from the compressor 15 to the air tank 16. That is, the check valve 14 is closed by backflow of the compressed air from the air dryer 12 toward the oil mist separator 11.

The air dryer 12 includes desiccant for trapping water and a filter for trapping oil mist. The air dryer 12 removes water contained in the compressed air and oil mist, or residual oil, from the compressed air.

The air dryer 12 includes a pressure governor 20, which outputs air pressure signals to a signal supply line 25. The pressure governor 20 detects the pressure in the air tank 16. When the pressure in the air tank 16 reaches a preset cut-out value, the pressure governor 20 outputs an air pressure signal. The air dryer 12 further incorporates a check valve 23. The check valve 23 is arranged at the outlet 12c and is open at normal times, when the air dryer 12 is delivering compressed dried air.

The air dryer 12 has a drain port 12a. The drain port 12a is connected to the oil separator 40 so that the pressure at the drain port 12a is the atmospheric pressure. A drain valve device 22 is provided at the drain port 12a. The drain valve device 22 is closed at normal times. The drain valve device 22 is opened when the output of an air pressure signal from the pressure governor 20 causes the air pressure on the upstream side of the drain valve device 22 to exceed a predetermined pressure. When the supply of compressed air from the compressor 15 is stopped and the drain valve device 22 is opened, the drain port 12a is opened. Accordingly, the compressed dried air in the air dryer 12 flows back through the desiccant to discharge water in the desiccant to the downstream side, thereby regenerating the desiccant. Also, the oil in the filter for trapping oil mist is discharged to the downstream side of the filter. Liquid that contains the water and the oil is drained to the downstream side from the drain port 12a.

When the pressure in the air tank 16 reaches the preset cut-out value, the drain valve device 22 is opened and the compressed dried air in the air tank 16 acts to flow back to the outlet of the air dryer 12. This flow closes the check valve 23, which is incorporated in the air dryer 12.

The oil mist separator 11 includes a trapping portion, which is a filter, and causes compressed air to pass through the filter to trap oil mist contained in the compressed air delivered from the compressor 15.

The oil mist separator 11 has a drain port 11a. The drain port 11a is connected to the oil separator 40 so that the pressure at the drain port 11a is the atmospheric pressure. A drain valve device 21 is provided at the drain port 11a of the oil mist separator 11. The drain valve device 21 has a pressure signal input port 11e. The pressure signal input port 11e is connected to the pressure governor 20 via the signal supply line 25. An air pressure signal output by the pressure governor 20 is delivered to the pressure signal input port 11e via the signal supply line 25. When the air pressure signal is input to the pressure signal input port 11e, compressed air is supplied to the drain valve device 21 of the oil mist separator 11. When the pressure on the upstream side of the drain valve device 21 exceeds a predetermined pressure, the drain valve device 21 is opened. For illustrative purposes, the pressure signal input port 11e and pipes connected thereto are shown in a schematic manner.

When the drain valve device 21 of the oil mist separator 11 is opened, the compressed air in the oil mist separator 11 flows back through the filter. The compressed air that flows back through the filter discharges oil trapped in the filter to the downstream side. The oil discharged to the downstream side of the filter is drained as liquid through the drain port 11a.

In the present embodiment, the signal supply line 25 is also connected to the compressor 15. When receiving an air pressure signal, the compressor 15 is switched from a mode for continuing to supply compressed air to a mode for stopping supply of compressed air, for example, through idling.

The oil separator 40 includes a separating portion, which is a filter, a reservoir for storing liquid, and a discharge port. The filter traps oil contained in the compressed air discharged from the oil mist separator 11 and the air dryer 12. The discharge port discharges the compressed air that has passed through the filter to the atmosphere. The compressed air, which has been cleaned by passing through the filter, is discharged to the atmosphere.

Next, the structure of the passage will be described that drains the liquid drained from the oil mist separator 11 and the liquid drained from the air dryer 12 to the oil separator 40. The drain port 11a of the oil mist separator 11 is connected to a branch pipe 30 that has three ports. The drain port 12a of the air dryer 12 is connected to one end of an upstream hose 31 via an upstream drain passage, which is an L-shaped coupling pipe 37. The other end of the upstream hose 31 is connected to one of the ports of the branch pipe 30. Another port of the branch pipe 30 is connected to a drain passage, which is a common hose 32. The common hose 32 connects the branch pipe 30 to the oil separator 40. That is, the oil mist separator 11 and the air dryer 12 share the common hose 32. The branch pipe 30 and the upstream hose 31 constitute a connecting portion that connects the oil mist separator 11 and the air dryer 12 to a common drain passage.

Figure 2:
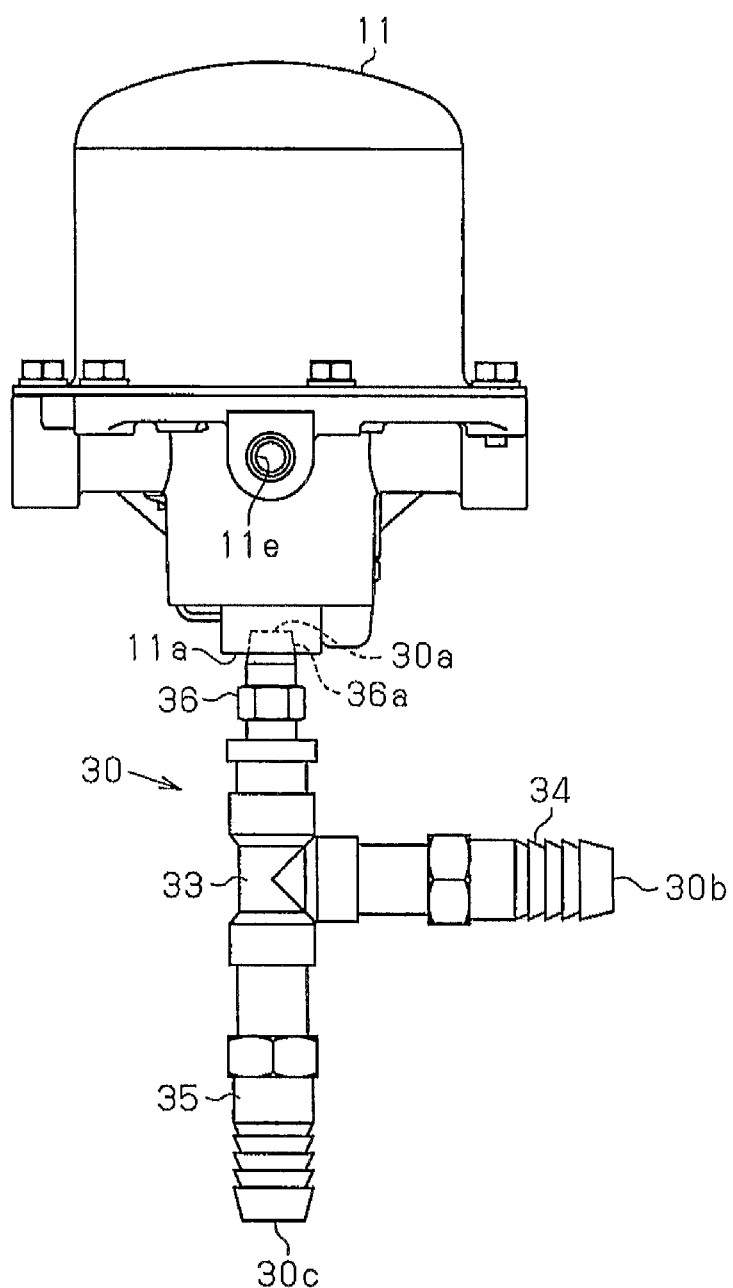
FIG. 2 is an explanatory front view showing the connecting structure of the oil mist separator and the branch pipe, which constitute the compressed-air drying system.

As shown in FIG. 2, the branch pipe 30 includes a T-shaped pipe joint 33 and hose connecting portions 34, 35 for connecting the upstream hose 31 and the common hose 32 to each other. A coupling portion 36 is provided between the drain port 11a of the oil mist separator 11 and the pipe joint 33. The coupling portion 36 is directly connected to the drain port 11a. The coupling portion 36 has an external thread portion 36a at the distal end. The external thread portion 36a is screwed into an internal thread portion (not shown) inside the drain port 11a, so that the branch pipe 30 is suspended from the oil mist separator 11. The branch pipe 30 has a first inlet 30a, which is connected to the oil mist separator 11, a second inlet 30b, which is connected to the outlet of the upstream hose 31, and an outlet 30c, which is connected to the inlet of the common hose 32.

The first inlet 30a, which is connected to the drain port 11a of the oil mist separator 11, and the outlet 30c are connected to each other via a straight passage formed by the coupling portion 36, the pipe joint 33, and the hose connecting portion 35. That is, the passage from the first inlet 30a to the outlet 30c of the branch pipe 30 is straight. In contrast, the second inlet 30b, which is connected to the drain port 12a of the air dryer 12, and the outlet 30c are connected to each other via a bent passage. That is, the passage from the second inlet 30b to the outlet 30c is crooked. Further, the drain port 11a of the oil mist separator 11 is connected to the inlet of the oil separator 40 via a passage formed by the branch pipe 30 and the common hose 32. In contrast, the drain port 12a of the air dryer 12 is connected to the inlet of the oil separator 40 via a passage formed by the coupling pipe 37, the upstream hose 31, the branch pipe 30, and the common hose 32. That is, the passage length from the oil mist separator 11 to the oil separator 40 is shorter than the passage length from the air dryer 12 to the oil separator 40. Thus, the pressure loss that occurs when liquid is drained from the oil mist separator 11 is less than the pressure loss that occurs when liquid is drained from the air dryer 12.

Operation of the compressed-air drying system will now be described. During the loading mode operation for removing oil mist and water from compressed air, the compressed air delivered from the compressor 15 flows into the oil mist separator 11 and passes through the filter, so that oil mist is trapped. The compressed air delivered from the oil mist separator 11 flows into the air dryer 12. When the compressed air passes through the air dryer 12, water and residual oil mist in the compressed air are trapped. The compressed dried air delivered from the air dryer 12 is stored in the air tank 16.

When the pressure in the air tank 16 reaches the preset cut-out value, the unloading mode operation is executed. In the unloading mode operation, the pressure governor 20 outputs an air pressure signal. In the present embodiment, when the air pressure signal is output, the drain valve device 21 of the oil mist separator 11 is opened before the drain valve device 22. For example, the valve opening pressure of the drain valve device 21 of the oil mist separator 11 may be set lower than the valve opening pressure of the drain valve device 22 of the air dryer 12, so that the drain valve device 21 of the oil mist separator 11 is opened before the drain valve device 22. The valve opening pressures of the drain valve devices 21, 22 can be regulated by adjusting the force of the springs in the drain valve devices 21, 22.

When the drain valve device 21 is opened, the compressed air in the oil mist separator 11 flows back through the filter and discharges the oil in the filter to the downstream side. The oil and the like discharged to the downstream side of the filter is drained as liquid through the drain port 11a. The liquid drained from the drain port 11a flows into the common hose 32 via the branch pipe 30 and is drained to the oil separator 40.

As described above, the pressure loss that occurs when liquid is drained from the oil mist separator 11 is reduced compared to that when liquid is drained from the air dryer 12. Thus, the compressed air quickly flows through the filter, increasing the oil discharge efficiency from the oil mist separator 11.

The drain valve device 22 of the air dryer 12 is opened by the air pressure signal. Then, the back flow of the compressed dried air from the air tank 16 closes the check valve 23 incorporated in the air dryer 12. As a result, the compressed air in the air dryer 12 flows back through the desiccant and the filter, so that liquid containing water is drained from the drain port 12a. At this time, since the liquid has already been drained from the oil mist separator 11, fluid is drawn to the downstream side in the branch pipe 30 and the upstream hose 31, so that the branch pipe 30 and the upstream hose 31 are depressurized. This facilitates drainage of liquid from the air dryer 12. The liquid drained from the air dryer 12 is collected in the oil separator 40 via the upstream hose 31, the branch pipe 30, and the common hose 32. The above described separating portion separates water, oil, and the like from air in the liquid collected by the oil separator 40.

When the pressure in the air tank 16 reaches the preset cut-in value, the pressure governor 20 stops outputting the air pressure signal. As a result, the drain valve devices 21, 22 are closed and the compressor 15 is activated, so that the loading mode operation is started.

As described above, the drain valve device 21 of the oil mist separator 11, of which the purge volume is small, is opened first and the liquid is drained preferentially. This limits the pressure loss that occurs when the oil mist separator 11 drains the liquid and also the pressure loss that occurs when the drain valve device 22 of the air dryer 12 is opened to drain the liquid after the oil mist separator 11. Particularly, in a case in which the branch pipe 30 is connected to the drain port 11a of the oil mist separator 11, the pressure loss is reduced significantly.

The oil mist separator 11 and the air dryer 12 share the common hose 32 and the oil separator 40. Compared to a configuration in which an oil separator 40 is provided for each of the oil mist separator 11 and the air dryer 12, the space occupied by the compressed-air drying system is reduced. Thus, even a vehicle with a limited installation space can mount the oil separator 40, which collects liquid drained from the oil mist separator 11. Further, since the branch pipe 30 is connected to the drain port 11a of the oil mist separator 11, the number of components is reduced compared to a case in which, for example, a hose is connected to the drain port 11a of the oil mist separator 11, and this hose is connected to the upstream hose 31. Also, since the branch pipe 30 is directly connected to the oil mist separator 11 to be suspended from the oil mist separator 11, no structure is required for fixing the branch pipe 30 to the vehicle body.

The above described connecting structure allows the oil separator 40 to be easily connected to the oil mist separator 11, which has already been installed in the vehicle. When the oil mist separator 11 and the oil separator 40 are connected to each other, the branch pipe 30 is coupled to the oil mist separator 11. The upstream hose 31 connected to the air dryer 12 or another hose is connected to the second inlet 30b of the branch pipe 30 of the oil mist separator 11, and the outlet 30c of the branch pipe 30 is connected the oil separator 40 with the common hose 32. This allows the existing oil separator 40 to be effectively utilized.

As described above, the present embodiment achieves the following advantages.

(1) Since the drain port 11a of the oil mist separator 11 is connected to the oil separator 40 via the branch pipe 30 and the common hose 32, the liquid drained from the oil mist separator 11 can be collected. Also, since the oil mist separator 11 and the air dryer 12 share the common hose 32 and the oil separator 40, the space occupied by the compressed-air drying system is reduced.

(2) The first inlet 30a of the branch pipe 30 is directly connected to the drain port 11a of the oil mist separator 11. Thus, the number of components is reduced compared to a case in which, for example, an upstream hose connected to the oil mist separator 11 and the upstream hose 31 are coupled to each other with a branch pipe.

(3) The first inlet 30a, to which the oil mist separator 11 is connected, and the outlet 30c of the branch pipe 30 are connected to each other by the straight passage. This reduces the pressure loss when the oil mist separator 11, which has a small purge volume, drains liquid, allowing the liquid to be discharged preferentially.

(4) The drain valve device 22 of the air dryer 12 is connected to the drain valve device 21 of the oil mist separator 11 by the signal supply line 25. This allows the drain valve devices 21, 22 to be opened with an air pressure signal output from the pressure governor 20. The valve opening pressure of the oil mist separator 11 is lower than the valve opening pressure of the air dryer 12. Thus, when the air pressure signal is output, the oil mist separator 11 first drains liquid before the air dryer 12. This allows the air dryer 12 to easily drain liquid.

OTHER EMBODIMENTS

The above described embodiment may be modified as follows.

Figure 3:
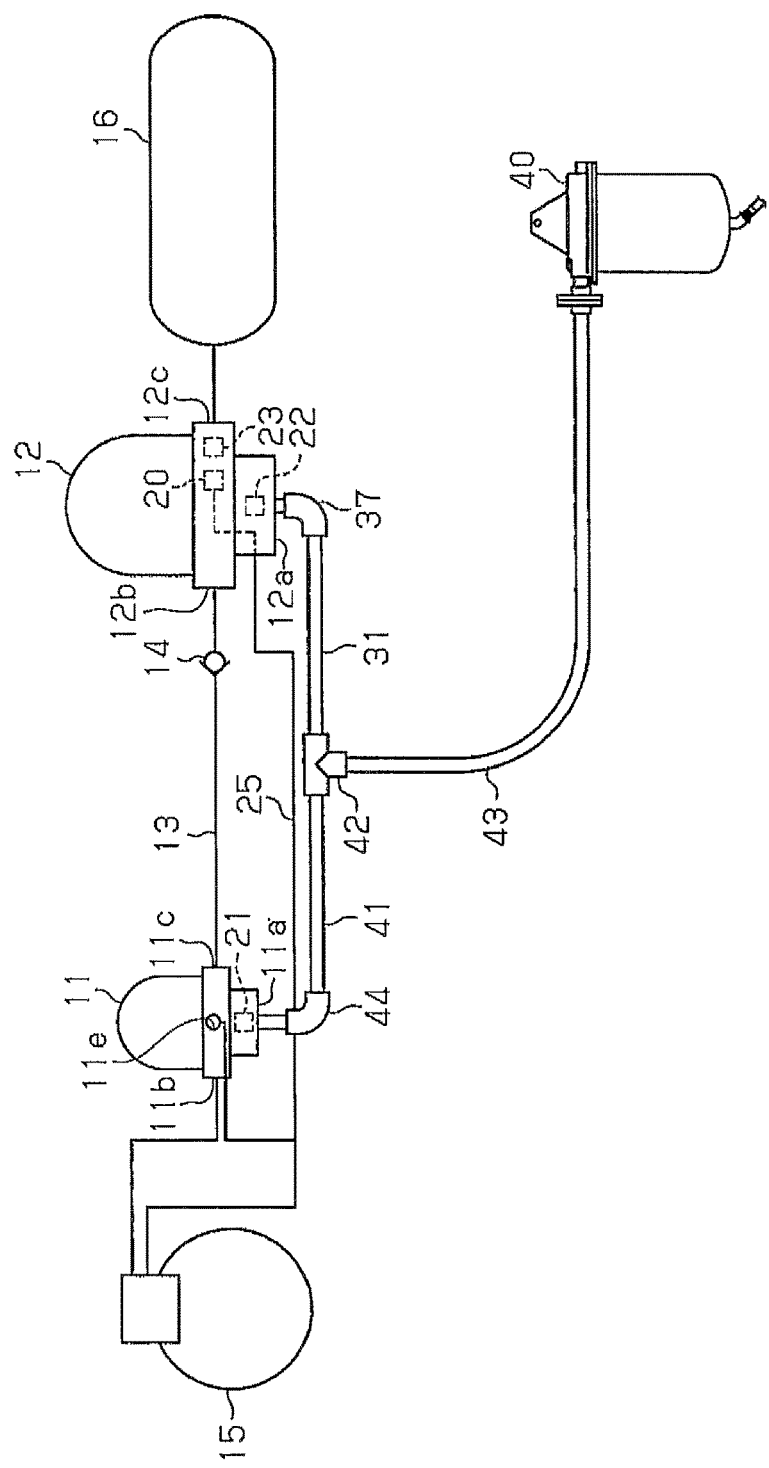
FIG. 3 is a diagram illustrating a compressed-air drying system of a modification.

The connecting structure of the oil mist separator 11 and the air dryer 12 with the oil separator 40 may be changed as illustrated in FIG. 3. That is, the connecting structure may include a coupling pipe 44 and an upstream hose 41, which are connected to the oil mist separator 11, a coupling pipe 37 and an upstream hose 31, which are connected to the air dryer 12, a T-shaped branch pipe 42, which connects the hoses 41, 31 together, and a common hose 43, which is connected to the outlet of the branch pipe 30. The branch pipe 42 is fixed to the vehicle body. Although having a greater number of components than the structure of the above illustrated embodiment, this structure may be more advantageous when the space below the drain port 11a of the oil mist separator 11 is limited.

Figure 4:
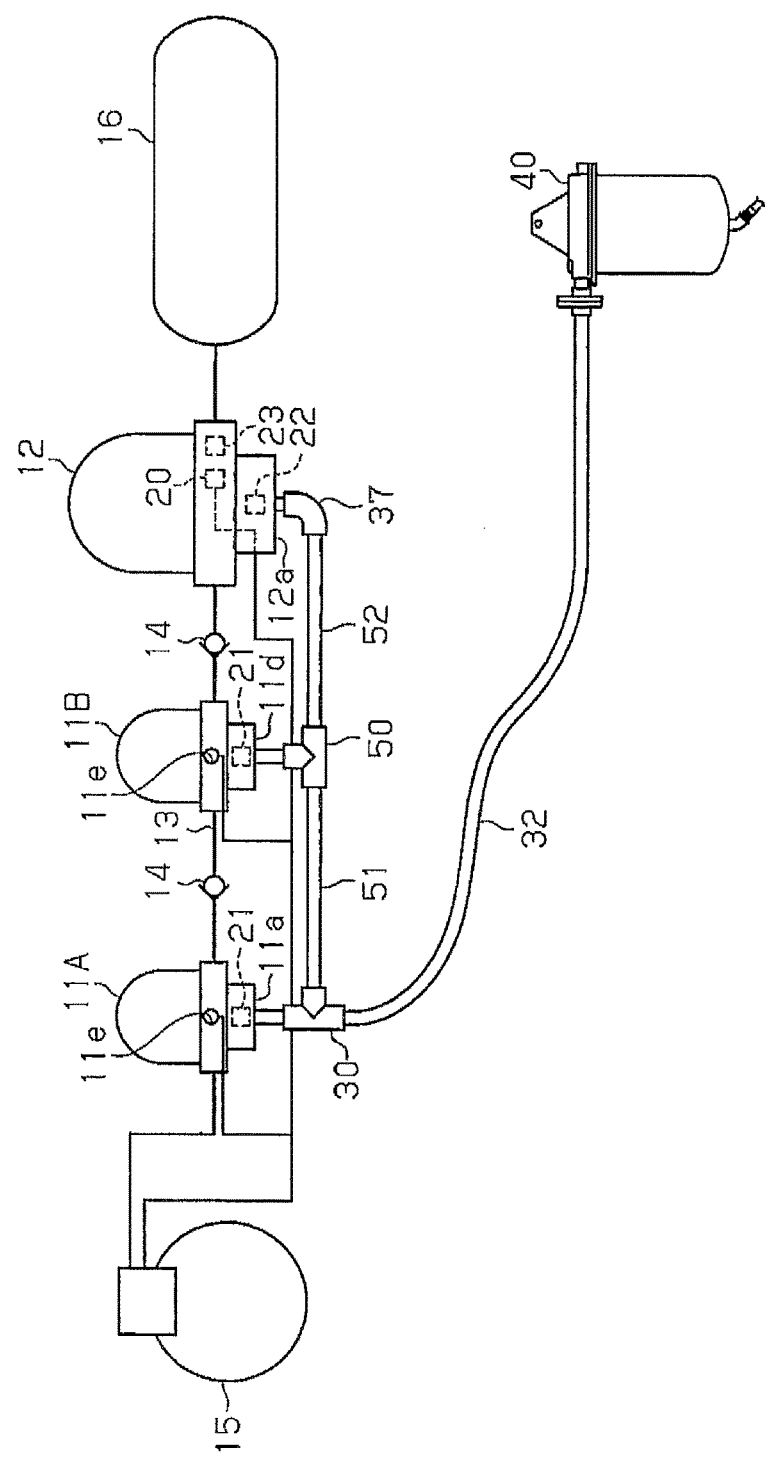
FIG. 4 is a diagram illustrating a compressed-air drying system of a modification.

As shown in FIG. 4, two oil mist separators 11A, 11B may be arranged between the compressor 15 and the air tank 16. When two or more oil mist separators 11 are provided, the drain port 11a of the one closest to the compressor 15 is connected to the first inlet 30a of the branch pipe 30, and the outlet of the branch pipe 30 and the oil separator 40 are connected to each other by the common hose 32. The second inlet 30b of the branch pipe 30 and the drain port 11d of the oil mist separator 11B on the downstream side are connected to each other by a hose 51 and T-shaped branch pipe 50. The branch pipe 50 is either fixed to the vehicle body or suspended from the oil mist separator 11B as shown in FIG. 2. Further, the discharge port of the oil mist separator 11B on the downstream side and the drain port 12a of the air dryer 12 are connected to each other by the branch pipe 50 and a hose 52. The passage length to the oil separator 40 increases in the order of the oil mist separator 11A on the upstream side, the oil mist separator 11B on the downstream side, and the air dryer 12. Accordingly, the pressure loss at drainage of liquid increases in the same order. During the unloading mode operation, liquid is drained from the oil mist separator 11A on the upstream side, the oil mist separator 11B on the downstream side, and the air dryer 12 in order. As described above, the oil mist separator 11A closest to the compressor 15 reduces the pressure loss when discharging liquid. This reduces the pressure loss of the other oil mist separator 11B and the air dryer 12. The branch pipe 30 is also connected to the drain port 11d of the oil mist separator 11B and the drain port 12a of the air dryer 12.

Figure 5:
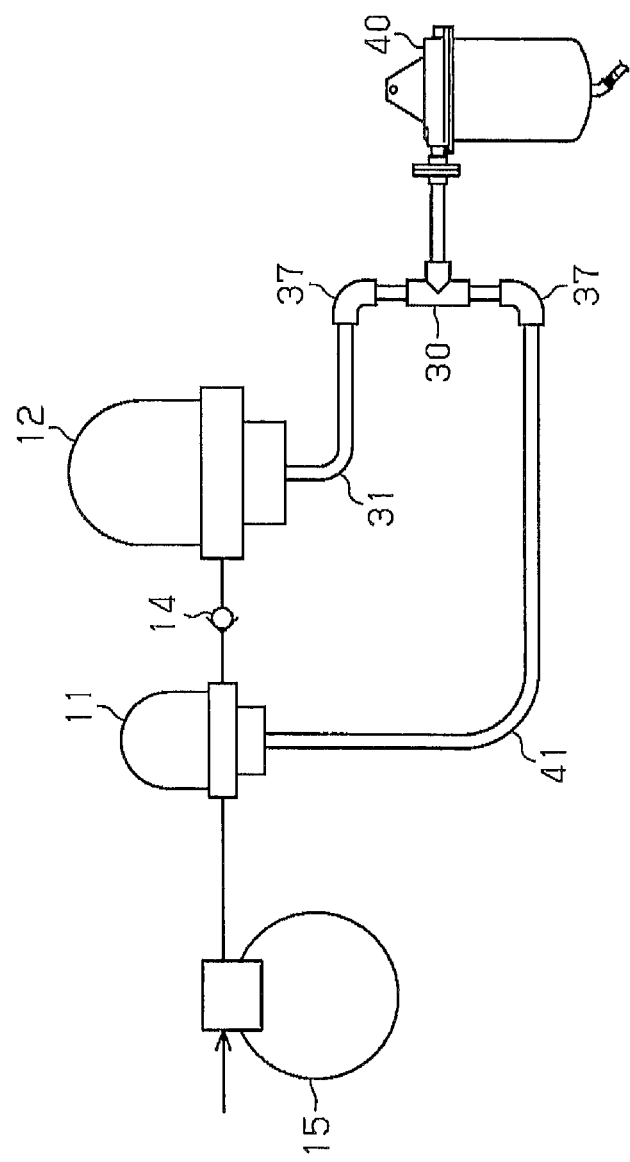
FIG. 5 is a schematic diagram illustrating a compressed-air drying system of a modification.

As shown in FIG. 5, the branch pipe 30 may be provided in the vicinity of the oil separator 40. For example, the upstream hose 41, which is connected to the oil mist separator 11, may be connected to the branch pipe 30 via the coupling pipe 37. Further, the upstream hose 31, which is connected to the air dryer 12, may be connected to the branch pipe 30 via the coupling pipe 37. In FIG. 5, the signal supply line 25 and the like are omitted.

The air dryer 12 is configured to include a filter for trapping oil mist. However, the filter may be omitted depending on the oil trapping performance of the oil mist separator 11.

The air dryer 12 is configured to incorporate the check valve 23. However, any other valve device may be employed at the outlet of the air dryer 12 as long as that valve device is configured to close during the unloading mode operation. The check valve 23, which is incorporated in the air dryer 12, may be located outside the air dryer 12 and arranged between the outlet of the air dryer 12 and the air tank 16.

The check valve 14, which is arranged between the oil mist separator 11 and the air dryer 12, may be incorporated in the oil mist separator 11. In this case, the check valve 14 is preferably arranged in the vicinity of the outlet of the oil mist separator 11.

In the above illustrated embodiment, the drain valve device 21 of the oil mist separator 11 is configured to be opened by an air pressure signal from the pressure governor 20 of the air dryer 12. However, the oil mist separator 11 may be provided with a dedicated pressure governor.

In the above illustrated embodiment, the drain valve device 21 of the oil mist separator 11 is configured to be opened prior to the drain valve device 22 of the air dryer 12. However, the drain valve device 22 of the air dryer 12 may be opened first. In this case, the drain port 12a of the air dryer 12 is connected to the branch pipe 30, and the drain port 11a of the oil mist separator 11 is connected to the upstream hose 31.

In the above illustrated embodiment, the oil separator 40, which separates liquid from compressed air, is used as a reservoir. However, any structure that stores liquid without discharging it onto the road surface may be employed as a reservoir. For example, it is possible to use a tank that has no filter and simply stores liquid drained from the common hose 32.

In the above illustrated embodiment, the upstream hose 31 and the branch pipe 30 constitute the connecting portion that connects the drain port 12a of the air dryer 12, the drain port 11a of the oil mist separator 11, and the common hose 32 to one another. However, any other members may constitute the connecting portion as long as those members achieve the passage structure similar to that in the above illustrated embodiment. For example, a unit obtained by integrating the upstream hose 31 and the branch pipe 30 may be employed.

Figure 6:
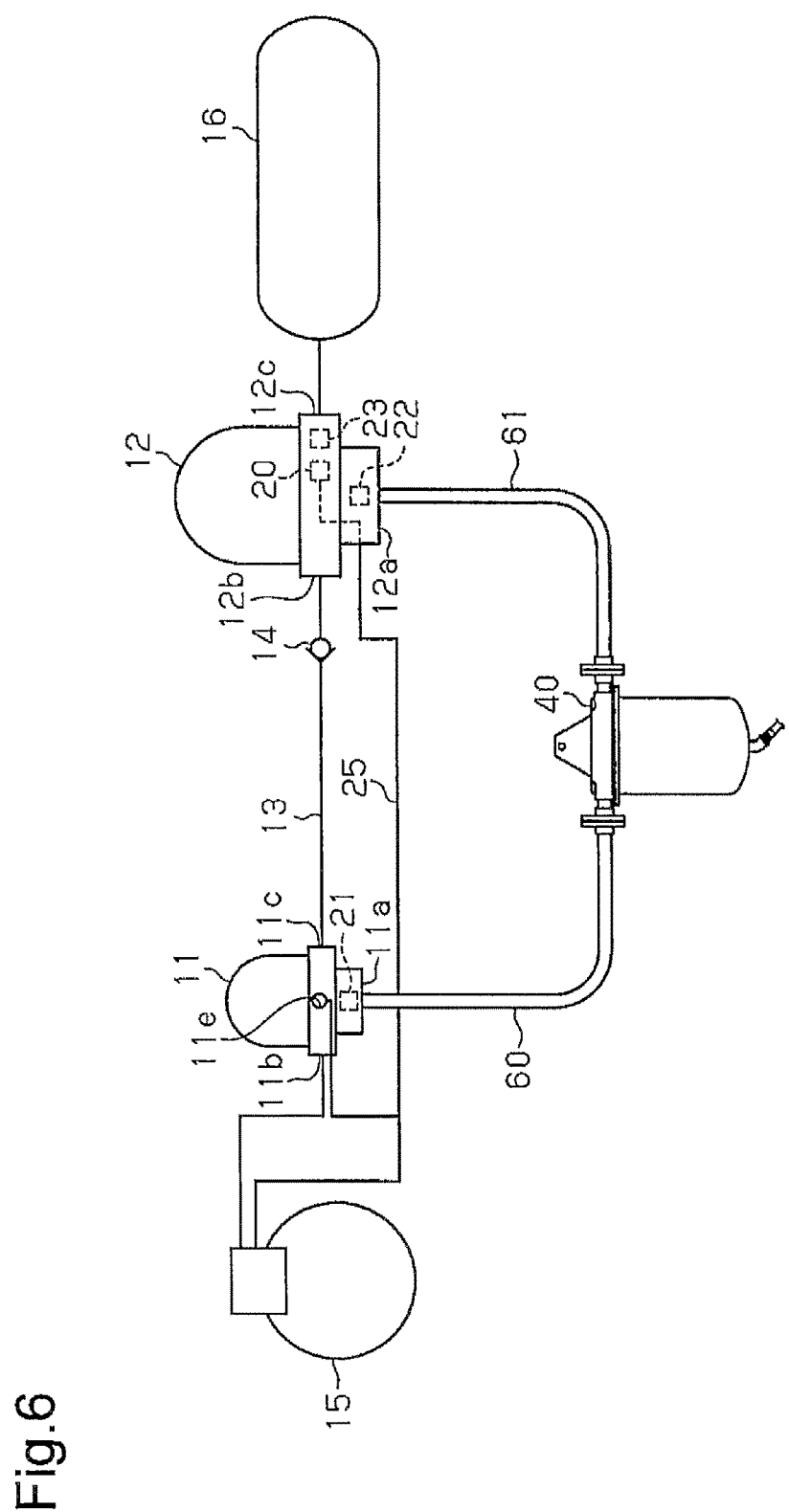
FIG. 6 is a schematic diagram illustrating a compressed-air drying system of a modification.

As shown in FIG. 6, the drain port 11a of the oil mist separator 11 and an inlet of the oil separator 40 may be connected to each other by a hose 60. Also, the drain port 12a of the air dryer 12 and another inlet of the oil separator 40 may be connected to each other by a hose 61 that is different from the hose 60 connected to the oil mist separator 11. Even with this configuration, the oil separator 40 is allowed to collect liquid drained not only from the air dryer 12, but also from the oil mist separator 11.

In the above illustrated embodiment, the oil mist separator is provided with a filter for trapping oil mist. However, oil mist may be separated, for example, through centrifuge separation or heat exchange. In any of these cases, the branch pipe 30 or the upstream hose 41 is connected to a drain port for draining liquid, which is the oil separated from compressed air.

In the above illustrated embodiment, the present invention is applied to a compressed-air drying system mounted on a vehicle. However, the present invention may also be applicable to a system for other mobile bodies with engines such as ships and aircrafts.

DESCRIPTION OF THE REFERENCE NUMERALS 11, 11A, 11B . . . Oil Mist Separator; 11a . . . Drain Port; 11b . . . Inlet; 11c . . . Outlet; 11d . . . Drain Port; 12 . . . Air Dryer; 12a . . . Drain Port; 12b . . . Inlet; 12c . . . Outlet; 13 . . . Passage, 14 . . . Check Valve; 15 . . . Compressor; 16 . . . Air Tank; 20 . . . Pressure Governor; 21, 22 . . . Drain Valve Device; 23 . . . Check Valve; 25 . . . Signal Supply Passage; 30 . . . Branch Pipe; 30a . . . First Inlet; 30b . . . Second Inlet; 30c . . . Outlet; 31 . . . Upstream Hose; 32 . . . Common Hose; 33 . . . Pipe Joint; 34 . . . Hose Connecting Portion; 35 . . . Hose Connecting Portion; 36 . . . Coupling Portion; 37 . . . Coupling Pipe; 40 . . . Oil Separator; 41 . . . Upstream Hose; 42 . . . Branch Pipe; 43 . . . Common Hose; 44 . . . Coupling Pipe; 50 . . . Branch Pipe; 51, 52, 60, 61 . . . Hose

The invention claimed is:

1. A compressed-air drying system configured to remove oil and water contained in compressed air delivered from a compressor, the system comprising:
   a pressure governor configured to output an air pressure signal to a supply passage;
   an air dryer including:
      desiccant,
      a drain port configured to drain liquid generated through regeneration of the desiccant, and
      a first drain valve device configured to be opened by the air pressure signal from the pressure governor;
   an oil mist separator including:
      a trapping portion configured to trap oil contained, as oil mist, in the compressed air,
      a drain port configured to drain liquid containing the trapped oil, and
      a second drain valve device configured to be opened by the air pressure signal from the pressure governor,
      wherein the oil mist separator is provided in a passage between the compressor and the air dryer;
   a reservoir configured to store the liquid drained from the air dryer and the liquid drained from the oil mist separator;
   a drain passage connected to the reservoir and configured to drain, to the reservoir, the liquid drained from the air dryer and the liquid drained from the oil mist separator; and
   a connecting portion that connects, to the drain passage, the drain port of the air dryer and the drain port of the oil mist separator,
   wherein, in an unloading mode operation, responsive to the pressure governor outputting the air pressure signal, the second drain valve device of the oil mist separator is first opened, and thereafter the first drain valve device of the air dryer is opened.

2. The compressed-air drying system according to claim 1, wherein the drain port of the air dryer is connected to an upstream drain passage configured to drain the liquid drained from the air dryer to a downstream side, and wherein the connecting portion includes
   a first inlet connected to the drain port of the oil mist separator,
   a second inlet connected to the upstream drain passage, and
   an outlet connected to the drain passage.

3. The compressed-air drying system according to claim 2, wherein the first inlet and the outlet of the connecting portion are connected to each other by a straight passage.

4. The compressed-air drying system according to claim 2, wherein the oil mist separator is one of a plurality of oil mist separators arranged between the air dryer and the compressor, and wherein the drain port of the oil mist separator that is closest to the compressor is connected to the first inlet of the connecting portion.

5. The compressed-air drying system according to claim 1, wherein the air dryer and the oil mist separator are located outside the reservoir.

6. A compressed-air drying system configured to remove oil and water contained in compressed air delivered from a compressor, the system comprising:

a pressure governor configured to output an air pressure signal to a supply passage;

an air dryer including:
desiccant,
a drain port configured to drain liquid generated through regeneration of the desiccant, and
a first drain valve device configured to be opened by the air pressure signal from the pressure governor;

an oil mist separator
a trapping portion configured to trap oil contained, as oil mist, in the compressed air,
a drain port configured to drain liquid containing the trapped oil, and
a second drain valve device configured to be opened by the air pressure signal from the pressure governor,
wherein the oil mist separator is provided in a passage between the compressor and the air dryer; and a reservoir configured to store the liquid drained from the air dryer and the liquid drained from the oil mist separator, wherein, in an unloading mode operation, responsive to the pressure governor outputting the air pressure signal, the second drain valve device of the oil mist separator is first opened, and thereafter the first drain valve device of the air dryer is opened, and wherein the drain port of the air dryer and the drain port of the oil mist separator are connected to the reservoir located outside the air dryer and the oil mist separator.

7. The compressed-air drying system according to claim 1, further comprising a check valve arranged between the oil mist separator and the air dryer in the passage and configured to restrict flow of compressed air from the air dryer to the oil mist separator.

8. The compressed-air drying system according to claim 1, wherein the first drain valve device of the air dryer is opened at a first pressure, wherein the second drain valve device of the oil mist separator is opened at a second pressure, and wherein the second pressure is lower than the first pressure.

9. The compressed-air drying system according to claim 8, wherein the first drain valve device comprises a first spring having a first force, wherein the second drain valve device comprises a second spring having a second force, and wherein the second force is lower than the first force.

10. The compressed-air drying system according to claim 1, wherein the second drain valve device of the oil mist separator is connected to the first drain valve device of the air dryer via the supply passage.

11. The compressed-air drying system according to claim 6, further comprising a check valve arranged between the oil mist separator and the air dryer in the passage and configured to restrict flow of compressed air from the air dryer to the oil mist separator.

12. The compressed-air drying system according to claim 6, wherein the first drain valve device of the air dryer is opened at a first pressure, wherein the second drain valve device of the oil mist separator is opened at a second pressure, and wherein the second pressure is lower than the first pressure.

13. The compressed-air drying system according to claim 12, wherein the first drain valve device comprises a first spring having a first force, wherein the second drain valve device comprises a second spring having a second force, and wherein the second force is lower than the first force.

14. The compressed-air drying system according to claim 6, wherein the second drain valve device of the oil mist separator is connected to the first drain valve device of the air dryer via the supply passage.

* * * * *